United States Patent [19]

Buchin

[11] Patent Number: 5,748,812

[45] Date of Patent: May 5, 1998

[54] HIGH-SPEED OPTICAL SWITCH

[76] Inventor: Michael P. Buchin, 723 Southampton Dr., Palo Alto, Calif. 94303

[21] Appl. No.: 677,407

[22] Filed: Jul. 9, 1996

Related U.S. Application Data

[62] Division of Ser. No. 353,532, Dec. 9, 1994, Pat. No. 5,535,293.

[51] Int. Cl.⁶ .................................................... G02B 6/26
[52] U.S. Cl. ................................ 385/18; 385/23; 385/33; 385/36
[58] Field of Search ........................... 385/18, 19, 20, 385/27, 32, 23, 33, 24, 36, 47, 117, 119, 88, 89, 93; 250/227.21; 359/237, 238, 234, 235, 298, 214

[56] References Cited

U.S. PATENT DOCUMENTS

| | | | |
|---|---|---|---|
| 3,958,104 | 5/1976 | Zuckerman | 235/470 |
| 4,060,322 | 11/1977 | Hirayama | 355/60 |
| 4,498,730 | 2/1985 | Tanaka et al. | 385/18 |
| 4,626,066 | 12/1986 | Levinson | 385/22 |
| 4,801,194 | 1/1989 | Agostinelli et al. | 359/259 |
| 4,838,631 | 6/1989 | Chande et al. | 359/201 |
| 4,838,637 | 6/1989 | Torok et al. | 385/34 |
| 4,938,555 | 7/1990 | Savage | 385/18 |
| 4,989,932 | 2/1991 | Landa et al. | 385/18 |
| 5,199,088 | 3/1993 | Magel | 385/18 |
| 5,204,922 | 4/1993 | Weir et al. | 385/18 |
| 5,420,946 | 5/1995 | Tsai | 385/22 |
| 5,436,986 | 7/1995 | Tsai | 385/18 |
| 5,444,801 | 8/1995 | Laughlin | 358/16 |
| 5,481,631 | 1/1996 | Cahill et al. | 385/18 |

FOREIGN PATENT DOCUMENTS 55-147603  11/1980  Japan ........................ 385/18

OTHER PUBLICATIONS

Catalog, "Oriel Motorized Beam Steerers," one page, Feb. 1994.

Bruce Rohr, Speed vs. Accuracy in Galvo–Based Scanners, four pages, reprinted with the assistance of Gordon Publications, Inc. Laser and Optronics, Feb. 1992.

*Primary Examiner*—Rodney B. Bovernick
*Assistant Examiner*—Hemang Sanghavi
*Attorney, Agent, or Firm*—Limbach & Limbach L.L.P.

[57] ABSTRACT

A high-speed optical switch having a first light port, a second light port, a focussing system, a mirror, and a motor. The focussing system focuses light from the first light port at a focal point via a first optical path, and focuses light from the second light port at a point at or near the focal point via a second optical path. The first optical path is angularly separated from the second optical path. The mirror is located at or near the focal point. The motor is coupled to the mirror and sequentially rotates the mirror back-and-forth between a first rotational position, at which the mirror reflects light from first light port into the second light port via the first optical path and the second optical path, and a second rotational position, at which the mirror reflects the light from the first light port to a location outside the second light port.

11 Claims, 13 Drawing Sheets

HIGH-SPEED OPTICAL SWITCH

This is a divisional of application Ser. No. 08/353,532, filed Dec. 9, 1994 now U.S. Pat. No. 5,535,293.

FIELD OF THE INVENTION

The invention relates to an high-speed optical switch for rapidly switching and controlling the intensity of a light beam, and the application of the high-speed optical switch in a light source generating a light beam having rapidly alternating spectral bands. In particular, the invention relates to apparatus for generating a light source having rapidly-alternating spectral bands for use in fluorescence microscopy, and in fluorescence excitation in other biomedical and industrial applications.

BACKGROUND OF THE INVENTION

The invention relates to an high-speed optical switch having a digital operating mode in which the apparatus rapidly switches a light beam. When used to switch a light beam between two optical paths, the high-speed optical switch can be used for generating a light beam having rapidly alternating wavelengths or spectral bands, primarily for the purpose of alternating or interleaving the excitation or illumination energy delivered to a target. In addition to alternating the spectral content of the light beam, the high-speed optical switch is also capable of operating as a shuttering system to cut off the light beam completely. The high-speed optical switch may also be used to chop a light beam. The high-speed optical switch has an analog operating mode in which it can be used to control the intensity of a light beam. The high-speed optical switch may be used in both its digital and analog operating modes. For example, it may be used to generate a light beam with rapidly alternating spectral bands and to selectively attenuate or amplitude modulate the light beam in either or both of the alternating spectral bands.

The most commonly-used apparatus for generating a light beam having rapidly-alternating or sequencing spectral bands is the filter wheel shown in FIGS. 1A and 1B. A number of filters, such as the filters 11 and 13, are mounted on the filter wheel 15, which is caused to rotate by a suitable motor (not shown). The filters 11 and 13 select different spectral bands of the light from the light source 17. To reduce the speed at which the filter wheel is required to rotate for a given modulation frequency, nominally identical filters, such as the filters 11 and 12, are located at regular angular intervals on the filter wheel. Light from the light source 17 is focussed by the lens 19 on the proximal end 21 of the light fibre 23. The filter wheel is interposed between the lens 19 and the proximal end of the light fibre. In some systems, the filter wheel is actually a glass disk with different filter elements formed in or on the surface of the disk.

While the approach shown in FIGS. 1A and 1B is conceptually simple, is suffers from several drawbacks. High speed implementations (e.g., implementations providing alternation frequencies at or above the video frame rate of 30 Hz) may require that the rotating parts be carefully balanced to minimize vibration. Alternatively, the number of nominally identical filters may be increased reduce the rotational speed required for a given alternation frequency, but this requires that the nominally identical filters, e.g., 11 and 12, have accurately matched characteristics. Changing the spectral bands selected by the apparatus can be cumbersome, requiring that multiple filters 11, 12, 13, and 14 be carefully installed in the filter wheel to preserve the balance of the rotating system, or requiring that whole the filter wheel assembly, consisting of the filters 11–14 and the filter wheel 15, be changed. If multiple filters are used to reduce rotations speeds, providing a wide choice of spectral bands is expensive because a set of at least two matched filters is required for each possible spectral band. Compensation for variations in the matched filters in a set of filters may also be required.

The filter wheel systems shown in FIGS. 1A and 1B usually run at fixed speeds, so changing the effective exposure time of each phase of excitation is not possible. The angular momentum of the rotating filter wheel prevents instantaneous stopping or shuttering, and also makes synchronization to an external clock, e.g., a video frame rate clock, difficult. Finally, because the edge of each filter progressively moves across the width of the light beam as the filter wheel rotates, the on-off transitions between the spectral bands is not abrupt, and the transitions may include a fixed period of no illumination, the duration of which may not be optimum for all applications. This results is a reduction of the duty cycle and loss of efficiency in energy delivery. In practice, commercial filter wheels designed for interchangeable filter elements are usually restricted to manual or slow speed (several Hertz) operation.

A second method of switching wavelengths is to use a motorized monochrometer. In this, the angle of a diffraction grating, which selects a narrow spectral band from a light source, or the angle of incidence of light on the diffraction grating, is modulated to change the selected spectral band. Some of these systems claim speeds of, or greater than, 30 Hz, but the light beam generated by such systems usually has a lower intensity than that of the light beam generated by filter-based systems, such as the filter-wheel systems just described. Monochrometers usually have a high f-number, which results in a poor optical coupling efficiency. Moreover, the spectral band selected by a monochrometer is normally narrow, in the range of 1–10 nm. Filter-based systems, on the other hand, usually have a low f-number, and therefore have a high optical coupling efficiency. Filter-based systems may be more versatile, and allow the interchangeable use of narrow-band, broad-band, or even more sophisticated multi-band filter elements. Filter-based systems provide greater ease of use in applications in which a relatively few spectral bands are consistently required.

An alternative filter-based system, which is a variation on the filter wheel system shown in FIGS. 1A and 1B is shown in FIGS. 1C and 1D. The variation shown in FIGS. 1C and 1D provides the advantages of a filter-based system discussed above, while overcoming some of the principal shortcomings of the filter wheel shown in FIGS. 1A and 1B. In the slotted-mirrored wheel system shown in FIGS. 1C and 1D, the light from a light source (not shown) is divided into first and second light beams 31 and 33, respectively, which are orthogonal to one another. The wavelength or spectral band-selective filter 35 is mounted in the first light beam 31, and the lens 39 focuses the filtered first light beam on the proximal end 21 of the light fibre 23. The wavelength or spectral band-selective filter 37 is mounted in the second light beam 33, and the lens 41 focuses the filtered second light beam on the proximal end 21 of the light fibre 23.

The slotted-mirrored wheel 43 is mounted in a plane at 45 degrees to both the first light beam 31 and the second light beam 33 to select one of the two light beams, or the other, to illuminate the proximal end 21 of the light fibre 23. The slotted-mirrored wheel includes holes, such as the holes 45 and 47 at regular angular spacings, which select the first light beam by passing the first light beam to illuminate the proximal end of the light fibre. Mounted on the slotted-mirrored wheel at regular angular intervals are the mirrors 49 and 51, which reflect the second light beam through an angle of 90° to illuminate the proximal end of the light fibre.

With this approach, it is easier to use multiple mirrors and holes to reduce the rotational speed of the slotted-mirrored wheel required to provide a given alternation frequency because the problems of matching the mirror characteristics are less severe. Moreover, changing the filters is simpler, and the cost of the filters required to provide a wide selection of spectral bands is less. However, the slotted-mirrored wheel still suffers from the above-described limitations resulting from the large angular momentum and inertia of a wheel-based system.

It is also known to use liquid filter technology to activate different filter layers sandwiched in a filter stack. However, this method is inflexible, because the filter selection is fixed once the assembly is constructed, and is limited to the visible region of the spectrum.

Finally, it is known to use two light sources with filters selecting different spectral bands or wavelengths, and to combine the light beams generated by the two light sources. Wavelength or spectral band alternation is provides by alternately switching the power supplies to the light sources on and off. This approach is relatively expensive, because it requires two light sources, and also requires special switchable power supplies for the light sources.

SUMMARY OF THE INVENTION

The invention first provides a high-speed optical switch comprising a first light port, a second light port, a focussing system, a mirror, and a motor. The focussing system focuses light from the first light port at a focal point via a first optical path, and focuses light from the second light port at a point at or near the focal point via a second optical path. The first optical path is angularly separated from the second optical path. The mirror is located at or near the focal point. The motor is coupled to the mirror and sequentially rotates the mirror back-and-forth between a first rotational position, at which the mirror reflects light from first light port into the second light port via the first optical path and the second optical path, and a second rotational position, at which the mirror reflects the light from the first light port to a location outside the second light port.

The light from the first light port reflected from the mirror forms a reflected light beam. The motor may include intensity changer that changes the first rotational position to vary an amount of the reflected light beam entering the second light port relative to a maximum amount. The optical switch may additionally comprise a sensor that senses the intensity of the light beam emanating from the second light port and for provides a feedback signal to the intensity changer. In this case, the intensity changes operates in response to the feedback signal to control the intensity of the light emanating from the second light port to a predetermined value. When the light from the first light port is subject to intensity fluctuations, the sensor and the intensity changer may operate to reduce noise in the light beam emanating from the second light port due to the intensity fluctuations in the light from the first light port.

The invention next provides a high-speed optical multiplexer/demultiplexer comprising a first light port, a second light port, a third light port, a focussing system, a mirror, and a motor. The focussing system focusses light from the first light port at a focal point via a first optical path, focuses light from the second light port at or near the focal point via a second optical path, and focuses light from the third light port at or near the focal point via a third optical path. The first optical path, the second optical path, and the third optical path are angularly separated from one another. The mirror is located at the focal point. The motor is coupled to the mirror, and rotates the mirror to perform selective switching of light received by at least one of the first light port, the second light port, and the third light port. The selective switching includes switching light received by the first light port between the second light port and the third light port, and switching light received by the second light port and the third light port to the first light port.

Finally, the invention provides an apparatus for spectrally modulating an excitation light beam. In the apparatus, an input port receives light from a light source. A focussing system focusses the light from the input port at a focal point. A mirror is rotatably mounted at or near the focal point. A first optical system receives light from the focussing system after reflection by the mirror at a first angle of incidence, and converts the light reflected by the mirror into a first light beam. A second optical system receives light from the focussing system after reflection by the mirror at a second angle of incidence, different from the first angle of incidence, and converts the light reflected by the mirror into a second light beam. A first modify system is disposed in the first light beam and modifies the light received by the input port. A combiner combines the first light beam with the second light beam to provide a combined light beam. Finally, a motor, coupled to the mirror, rotates the mirror over an angular range including the first angle of incidence and the second angle of incidence to switch light received by the input port between the first optical system and the second optical system.

DETAILED DESCRIPTION OF THE INVENTION

The high-speed optical switch according to the invention will first be described with reference to FIG. 2, in which the high-speed optical switch according to the invention is used in its digital mode in an alternating-band light source according to the invention for use in fluorescence microscopy, for example. The alternating-band light source according to the invention provides a light beam having rapidly alternating wavelengths or spectral bands. In the alternating-band light source according to the invention, the rate of switching of the spectral bands provided by high-speed optical switch according to the invention is very high, is easily variable, and has a duty cycle that is easily variable. When the alternating-band light source is used to provide a non-coherent light output, the high-speed optical switch can additionally be used in its analog mode to control the relative intensity of, and reduce noise due to amplitude fluctuations in, the spectral bands.

In the version of the high-speed optical switch according to the invention used in the alternating band light source according to the invention, an input light beam is reflected by a mirror that is rotatable about an axis. Rotating the mirror back-and-forth about the axis alternately switches the reflected light beam reflected by the mirror into one of two (or more) different output optical paths. The mirror is preferably rotatable about an axis that is substantially perpendicular to the plane defined by the input light beam and the output optical paths.

Alternatively, as will be described below with reference to FIG. 10, the high-speed optical switch according to the invention may be used to chop a light beam, in which case, only one output optical path is required.

The high-speed optical switch according to the invention employs input and output optical systems to minimize the size of the light beam at the mirror. This enables the mirror to be made very small to minimize the moment of inertia of the mirror. The low-inertia of the mirror enables it to be driven by a high-speed galvanometric motor, which also has low moment of inertia. The small size and low moment of inertia of the moving part of the high-speed optical switch enables the optical switch to switch a light beam between different optical paths at a high rate and with high flexibility.

Figure 3A:
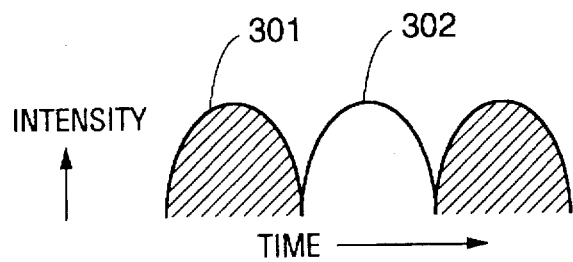
FIG. 3A is a graph of the variation with time of the intensity of the combined light beam generated by the alternating-band light source according to the invention using a resonant-drive galvanometer motor.

A resonant-drive galvanometer motor may be used to drive the mirror. This approach is low in cost, but will only operate at a fixed frequency, namely, the resonant frequency of the galvanometer motor. Moreover, since the motion of the mirror is sinusoidal, the intensity of the alternating band output has the form of a full-wave rectified sine-wave, as shown in FIG. 3A. FIG. 3A shows the intensity of consecutive cycles of a first spectral band 301 and a second spectral band 302.

Using a galvanometer motor having an open-loop analog drive enables the alternation frequency of the combined light beam to be controlled. However, the preferred embodiment uses a galvanometer motor with a closed-loop, servo-controlled analog drive, which gives a higher speed and accuracy than a galvanometer motor with an open-loop analog drive. Using a galvanometer motor with a closed-loop analog drive not only allows the alternation frequency of the combined light beam to be controlled, but, when a complex drive waveform is applied, also allows the rotational speed and the rate of change of rotational speed of the galvanometer motor and mirror to be varied during the course of the rotational cycle, which enables the duty cycle of the combined light beam to be controlled, as shown in FIG. 3B.

Figure 3B:
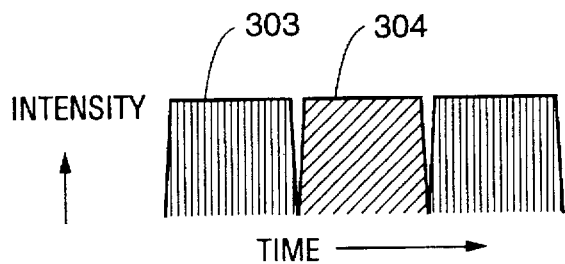
FIG. 3B is a graph of the variation with time of the intensity of the combined light beam generated by the alternating-band light source according to the invention using a closed-loop analog drive galvanometer motor. The graph shows the larger duty cycle afforded using the closed-loop analog drive galvanometer motor.

It can also be seen from FIG. 3B that the use of a galvanometer motor with a closed-loop analog drive provides a larger duty cycle than that provided by the galvanometer motor with a resonant drive shown in FIG. 3A. FIG. 3B shows the intensity of consecutive cycles of a first spectral band 303 and a second spectral band 304.

Figure 3C:
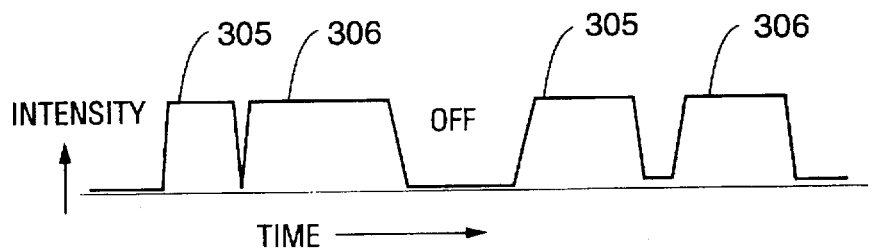
FIG. 3C is a graph of the variation with time of the intensity of the combined light beam generated by the alternating-band light source according to the invention using a closed-loop analog drive galvanometer motor. The graph shows the ability of the closed-loop analog drive galvanometer motor to control the mark-space ratio of the spectral bands, to shutter the combined light beam "off," and to control the off between consecutive spectral bands.

Also, as shown in FIG. 3C, using a galvanometer motor with a closed-loop analog drive enables the mark-space ratio between the alternating spectral bands to be varied, the combined light beam to be shuttered off, and the off time between the alternating spectral bands to be varied. FIG. 3C shows the intensity of consecutive cycles of a first spectral band 305 and a second spectral band 306.

Figure 3D:
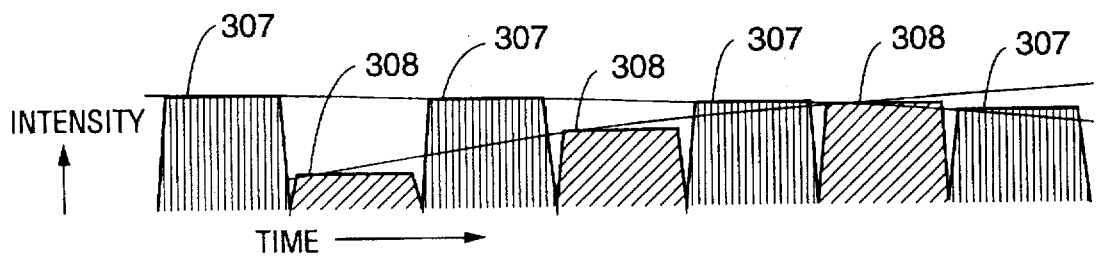
FIG. 3D is a graph of the variation with time of the intensity of the combined light beam generated by the alternating-band light source according to the invention using a closed-loop analog galvanometer motor. The graph shows the ability of the closed-loop analog drive galvanometer motor to vary the angle of rotation of the mirror to control the intensity of the spectral bands in the combined light beam.

Using a galvanometer motor with a closed-loop analog drive also enables the angle of rotation of the mirror to be changed in either direction of rotation. This ability provides the optical switch with its analog operational mode. Changing the angle of rotation varies the amount of the reflected light beam entering the output optical path. This, in turn, enables the intensity of the output light beam in the two output optical paths to be varied and controlled, and the intensity of the spectral bands in the combined light beam to be controlled. FIG. 3D shows the intensity of consecutive cycles of a first spectral band 307 and a second spectral band 308 in the combined light beam. Changing the angle of rotation of the mirror also enables intensity control to be provided when the optical switch according to the invention is used to multiplex light beams entering the optical switch via two input optical paths. Finally, as will be described in more detail below, changing the maximum angle of rotation of the mirror can be used in an optical switch according to the invention having only one output optical path the control the intensity of a chopped or static light beam.

The high-speed optical switch according to the invention provides high speed continuous chopping and/or a wide variety of other modes, including instantaneous variable speeds, variable duty cycles, shuttering (full and partial), modulation (frequency and/or amplitude), etc. The galvanometer motor may be driven using simple digital or complex analog waveforms to provide flexibility and configurability.

As mentioned above, a key feature of the high-speed optical switch according to the invention is the use of an input optical system in each input optical path to focus the input light beam in the optical path on or near the galvanometer motor-driven mirror, and the use of an output optical system in each output optical path to re-converge the diverging light beam reflected by the mirror into a substantially parallel light beam. Put another way, if the direction of the output light beam in the output optical path were reversed, the output optical system would focus the output light beam at the point at or near the point at which the input optical system focusses the input light beam. In the following description, where reference is made to focusing the input light beam or the output light beam (when its direction is reversed) at the mirror, it is to be understood that this encompasses focussing the input light beam or the output light beam near the mirror so that the input light beam or the output light beam form a spot on the mirror that is small compared with the respective cross sections of the light beams.

The input optical system and the output optical system enable the mirror to be located at a position in the optical path where the cross section of the light beam is significantly smaller than the cross section of the light beam before the light beam enters the input optical system and after the light beam leaves the output optical system. This enables the size of the mirror required to deflect the beam to be minimized. This, in turn, minimizes the moment of inertia of the mirror and of the galvanometer motor required to drive the mirror, thereby increasing the maximum switching speed. The preferred embodiment has a −3 dB frequency of about 400 Hz.

When the high-speed optical switch according to the invention is used in the alternating-band light source according to the invention, there is one input optical path, and each of the output optical paths includes a spectrally-selective filter. The light in the two output optical paths is then combined to provide the alternating band light output of the light source.

Alternatively, the high-speed optical switch according to the invention can be used in other types of optical multiplexing systems, such as that which will be described below with reference to FIG. 9. Moreover, by reversing the light paths in the same optical arrangement, the high-speed optical switch can provide optical demultiplexing, such as that which will be described below with reference to FIG. 8.

Details of the embodiment of the invention shown in FIG. 2 will now be described in detail. The input optical path 105 begins with the input port 104 to which the lamp house 102, which includes a high-intensity light source, such as a xenon arc (not shown), is attached. Alternatively, the lamp house 102 may be built into the apparatus. It is preferred that the light beam generated by the lamp house 102 be collimated by an internal condenser lens (not shown), but, if the light beam from the lamp house is not collimated, it is straightforward to add suitable lenses and mirrors to produce a parallel, collimated light beam at the input port 104.

The input light beam 116 from the input port 104 is reflected through 45° by the heat filter 106 to remove unwanted infra-red radiation, thereby to reduce heating of the components of the system. The heat filter 106 may be an ultra-violet or a standard cold mirror, depending on the range of spectral bands that the apparatus will be required to generate. An ultra-violet cold mirror will pass wavelengths from 340 to 550 nm into the apparatus. Other first-stage filtering for different wavelength regions may be used, depending on the application. Alternatively, it the apparatus is designed to be used exclusively with a lamp house having a built-in heat filter, heat filtering, including the heat filter 106, may be omitted from the apparatus.

The light beam passed by the heat filter 106 may optionally be fed to an auxiliary output port (not shown) for use elsewhere.

The input optical system 107, which, in the embodiment shown, consists of the lens 108, focusses the input light beam 116 from the input port 104 on the mirror 110 to form on the mirror an image of the arc or filament of the light source in the lamp house 102. The mirror 110 reflects the input light beam 116 to provide the reflected light beam 117. In the preferred embodiment, the image of the arc or filament on the mirror 110 is only slightly more than one millimeter in diameter. Using the input optical system 107 to form a small image of the arc or filament of the light source enables a very small mirror to be used as the mirror 110.

The mirror 110 is mounted on the galvanometer motor 112, which, when the input optical path 105 and the output optical paths 109 and 111 are co-planar, preferably rotates about an axis that is generally perpendicular to the plane of the input optical path and the output optical paths 109 and 111. If the input optical path and the output optical path are not co-planar, the mirror rotates about an axis that enables the reflected light beam 117 to enter the output optical paths 109 and 111. In response to the drive signal 168 from the galvanometer driver 114, the galvanometer 112, and hence the mirror 110, rotate about the axis to deflect the reflected light beam 117 at different angles relative to the input light beam 116, depending on the rotational angle of the mirror 110. At opposite extremes of the angle of rotation, the reflected light beam 117 fully enters the respective one of the output optical paths 109 and 111 as the output light beam 118.

In the preferred embodiment, in which the galvanometer motor 112 is driven using a closed-loop feedback system, the feedback signal 166 provides information on the angle of rotation of the galvanometer motor 112, and hence of the mirror 110, to the galvanometer driver 114.

Figure 4A:
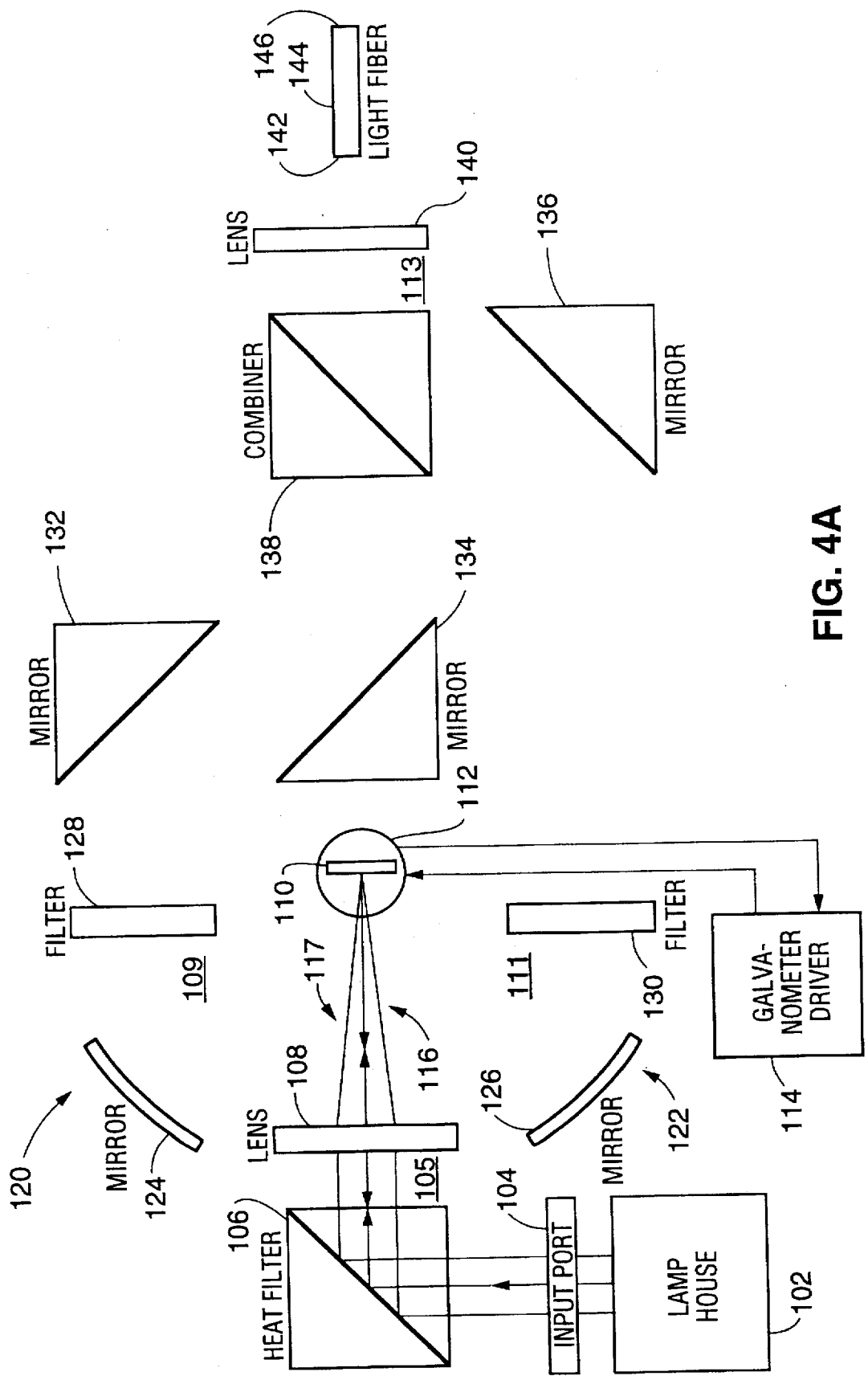
FIG. 4A shows the alternating-band light source according to the invention incorporating the high-speed optical switch according to the invention with the mirror in the rotational position that shutters the combined light beam "off."

With the mirror 110 at the rotational angle shown in FIG. 4A, the reflected light beam 117 enters the input optical path 105. In this case, the reflected light beam does not pass forward to either of the output optical paths 109 and 111, and the combined light beam 119 (FIG. 2) is shuttered off. The rotational angle shown in FIG. 4A may correspond to the driver 114 applying no drive voltage to the galvanometer motor 112.

Figure 4B:
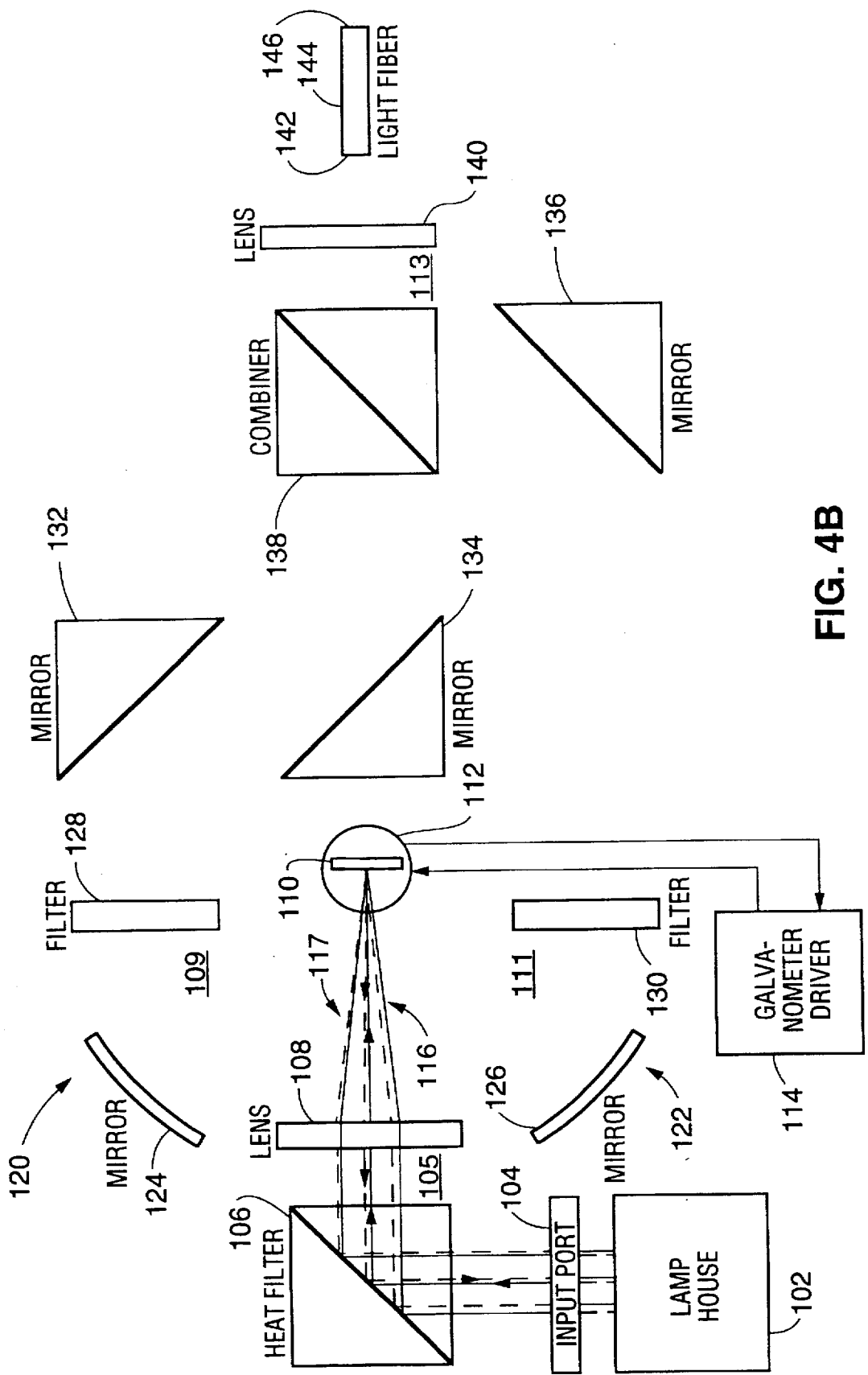
FIG. 4B shows the alternating-band light source according to the invention incorporating the high-speed optical switch according to the invention with the mirror in the rotational position that shutters the combined light beam "off" and prevents the reflected light beam from being focussed back on the light source in the lamp house.

Alternatively, the galvanometer driver 114 may cause the galvanometer motor 112 to rotate the mirror 110 to a slight angle relative to the input light beam 116, as shown in FIG. 4B. The reflected light beam 117 again enters neither of the output optical paths 109 and 111, and so the combined light beam is shuttered off. Instead, the reflected light beam enters the input optical system 105. However, the angular offset in the mirror prevents the optical system in the lamp house 102 from re-focussing the reflected light beam on the lamp (not shown) in the lamp house.

Figure 4C:
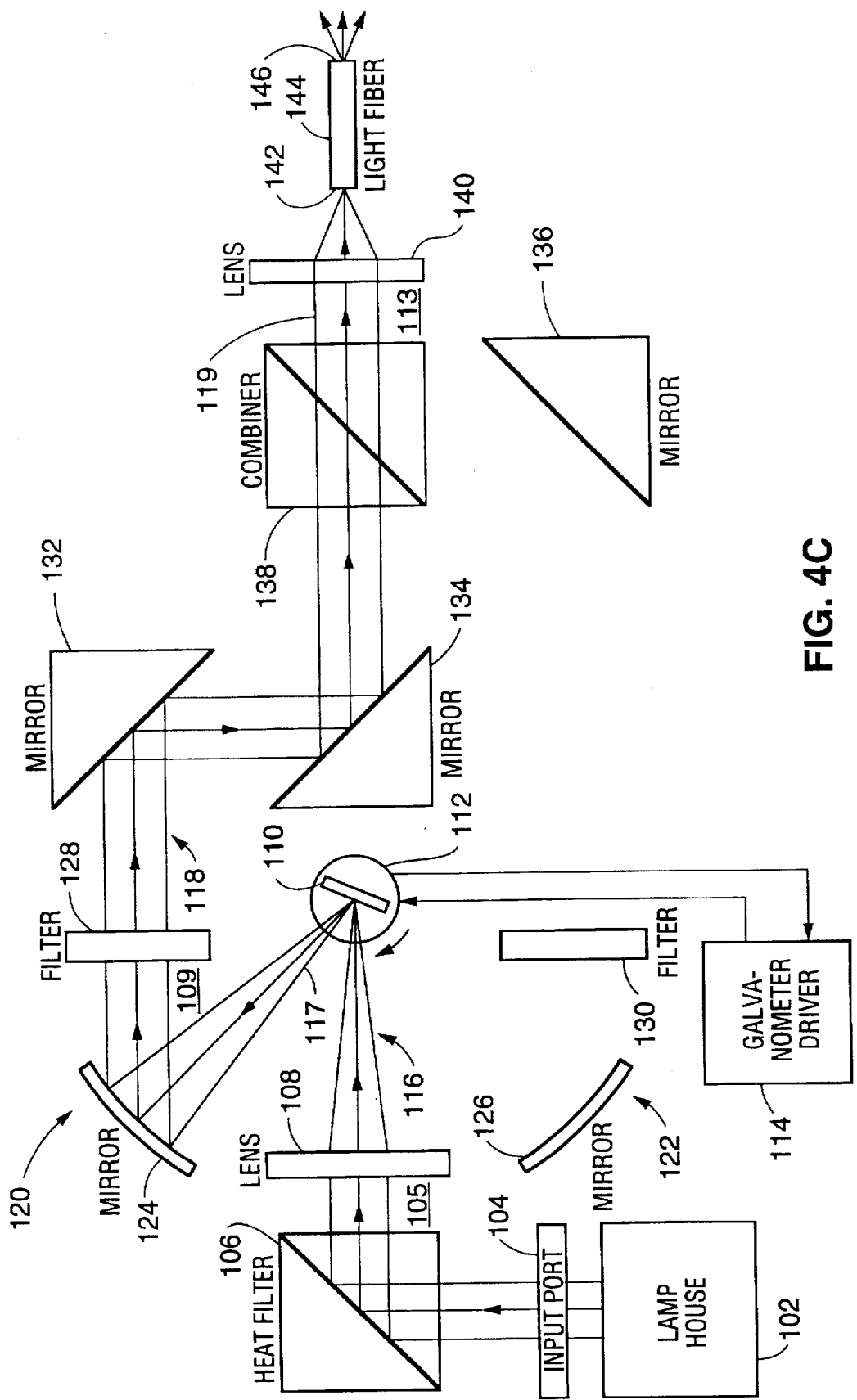
FIG. 4C shows the alternating-band light source according to the invention incorporating the high-speed optical switch according to the invention with the mirror in the rotational position that deflects the reflected light beam into one of the output optical paths.
Figure 4D:
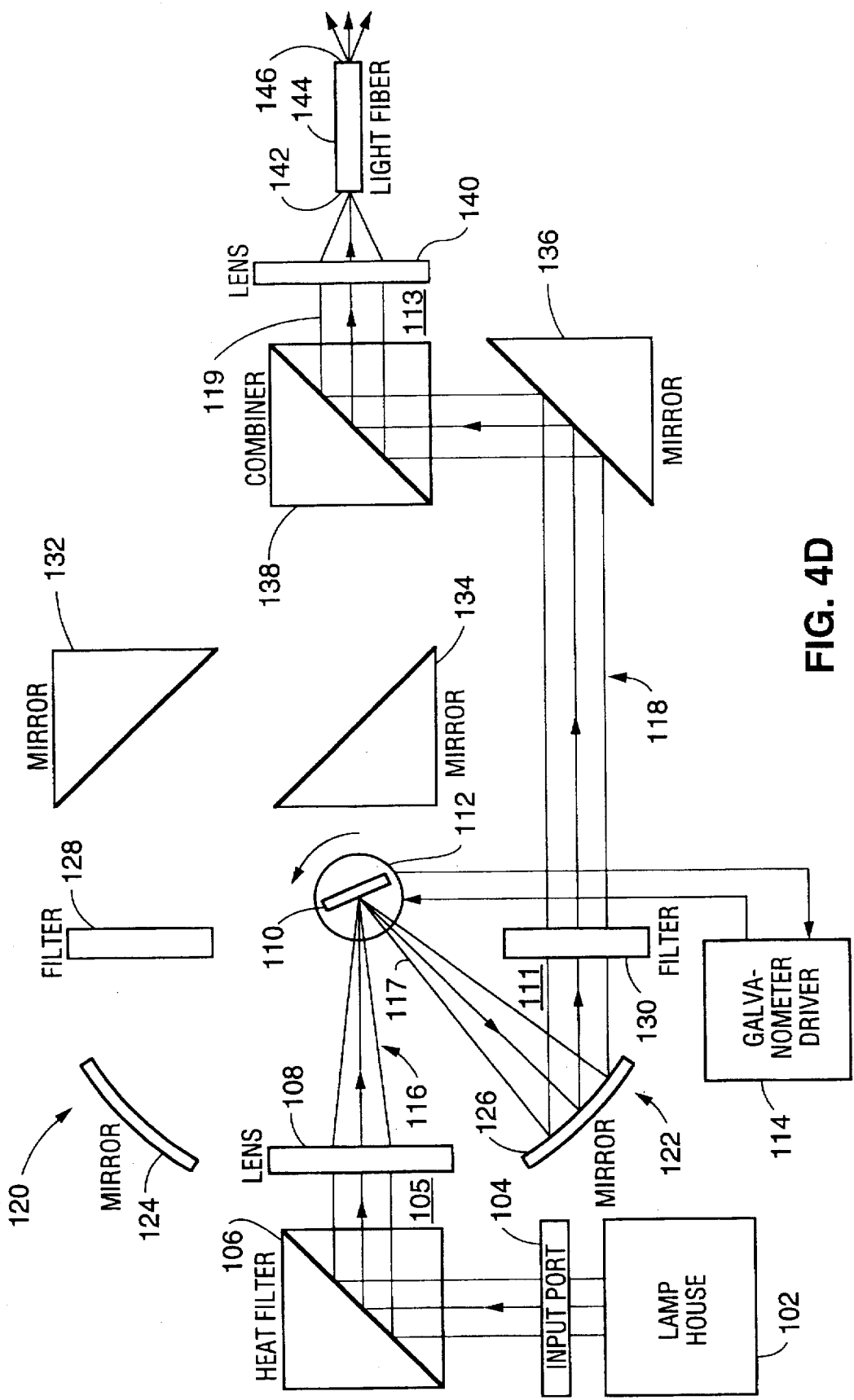
FIG. 4D shows the alternating-band light source according to the invention incorporating the high-speed optical switch according to the invention with the mirror in the rotational position that deflects the reflected light beam into the other of the output optical paths.

When the driver 114 applies the appropriate drive voltage waveform to the galvanometer motor 112, the galvanometer motor rapidly rotates the mirror 110 in a clockwise direction to deflect the reflected light beam 117 to the angle at which the reflected light beam enters the output optical path 109, as shown in FIG. 4C. Alternatively, the galvanometer motor rapidly rotates the mirror 110 in an anti-clockwise direction to deflect the reflected light beam 117 to the angle at which the reflected light beam enters the output optical path 111, as shown in FIG. 4D. The output optical path 109 and the output optical path 111 both lead to the combined optical path 113 of the light source.

When galvanometer motor 112 rotates the mirror 110 in the clockwise direction to deflect the reflected light beam 117 to the angle at which the reflected light beam enters the optical path 109, the reflected light beam enters the output optical path 109 via the output optical system 120, as shown in FIG. 4C. When the galvanometer 112 rotates the mirror 110 in the anti-clockwise direction to deflect the reflected light beam 117 to the angle at which the reflected light beam enters the output optical path 111, the reflected light beam enters the output optical path 111 via the output optical system 122, as shown in FIG. 4D.

Returning now to FIG. 2, the output optical systems 120 and 122 in the embodiment shown respectively consist of the off-axis parabolic mirrors 124 and 126. Each parabolic mirror both reflects and re-collimates the reflected light beam 117 as it diverges from the focal spot on the mirror 110 to form the output light beam 118. Alternatively, the output optical systems 120 and 122 may each include an appropriately placed mirror and lens.

The output light beam 118 passes through the respective output optical path 109 and 111 from the respective output optical system 120 and 122 to one of the spectral band selection filters 128 and 130. If dielectric filters are used for the spectral band selection filters 128 and 130, it is important that the output light beam be essentially a parallel light beam at this point because dielectric filters are sensitive to light angle. The cutoff and/or center frequency of a dielectric filter may shift if the output light beam is not collimated at the filter.

In the preferred embodiment, the spectral band selection filters 128 and 130 are off-the-shelf 25 mm filters installed in simple, slide-in filter mounts. With this arrangement, it is easy to change the spectral band selection filters 128 and 130 to change the spectral bands of the alternating band light output.

Following the spectral band selection filters 128 and 130, the output optical paths 109 and 111 recombine the light in the output optical paths to provide the alternating band light output in the combined optical path 113. The mirrors 132 and 134 deflect the output light beam 118 when it is in the output optical path 109, and the mirror 136 deflects the output light beam 118 when it is in the output optical path 111, so that, irrespective of the output optical path by which it travels, the output light beam falls on the combiner 138. The mirrors 132, 134, and 136 are preferably high-reflectance, broadband, first-surface mirrors.

The combiner 138 may be a broadband-type combiner, e.g., a dielectric, or polka-dot "reverse" beam splitter, which passes and reflects the output light beam 118 received from either the output optical path 109 or the output optical path 111 onto the output lens 140 with an efficiency of 40–50% for each output optical path. Alternatively, the combiner 138 may be a dichroic long-pass filter which passes the output light beam from the mirror 134 in the output optical path 109 with an efficiency of 80–90%, and reflects the output light beam from the mirror 136 in the output optical path 111 with an efficiency of 80–90%. This alternative has a higher efficiency than that of a broadband combiner, but requires matching of bandpass and combiner sets.

The resulting combined light beam 119 passes from the combiner 138 to the output lens 140 through the combined optical path 113. The output lens 140 refocuses the combined light beam onto the proximal end 142 of the light fiber 144, which delivers the combined light beam to the microscope or other instrument. Alternatively, the output lens 140 may be omitted, and the collimated combined light beam from the combiner 138 may be input directly to the port of the microscope normally used for coupling light sources for fluorescence excitation.

In tests, an embodiment using a GS138 galvanometer, sold by General Scanning, with a 10×17 mm mirror and a closed-loop driver had measured switching speeds of 1.2 ms between the two output optical paths 109 and 111 in which the output optical systems 120 and 122 were 30° off-axis parabolic mirrors, and the galvanometer motor 112 was operated in a ±30° optical step mode. On-to-off time was measured at less that one ms. In a continuous-chop mode with a square-wave drive, the system operated at frequencies of up to 500 Hz. The high operating speeds of the system made synchronizing to video or other clocked systems straightforward. It is envisaged that a galvanometer having a considerably smaller mirror, for example, 5×7 mm, will be used in commercial embodiments. The smaller mirror will enable yet higher speeds to be achieved.

The mirror 110 has an angle of rotation at which the reflected light beam 117 fully enters the output optical path 109 or the output optical path 110. When the reflected light beam fully enters an output optical path, the intensity of the combined light beam is a maximum. This angle of rotation is called the "maximum" angle of rotation. The word "maximum" in the term "maximum angle of rotation" refers to the intensity of the combined light beam, and not to the angle through which the mirror is rotated. A high-speed optical switch according to the invention has a maximum angle of rotation for each of its output optical paths.

Tests show that when the alternating-band light output is fed from the output lens 140 to the light fibre 144, or to some other element that homogenizes the light output (i.e., removes the spatial coherence of the light output), and the angle of rotation of the mirror 110 is reduced to an angle less than the maximum angle of rotation, so that only part of the reflected light beam 117 enters the output optical path 109 or the output optical path 111, the light intensity measured at the distal end 146 of the light fiber 144 is reduced without significantly impairing the uniformity of the illumination at the distal end of the light fibre.

Figure 5A:
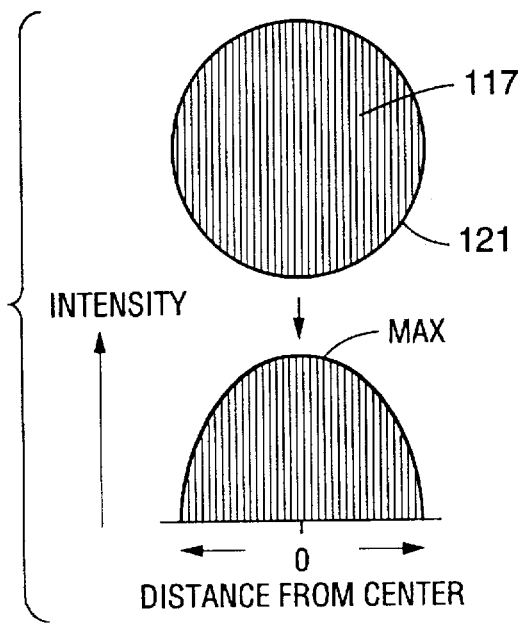
FIGS. 5A, 5B, and 5C show how the angle of rotation of the mirror can be changed to control the intensity of the combined light beam following homogenization.
Figure 5B:
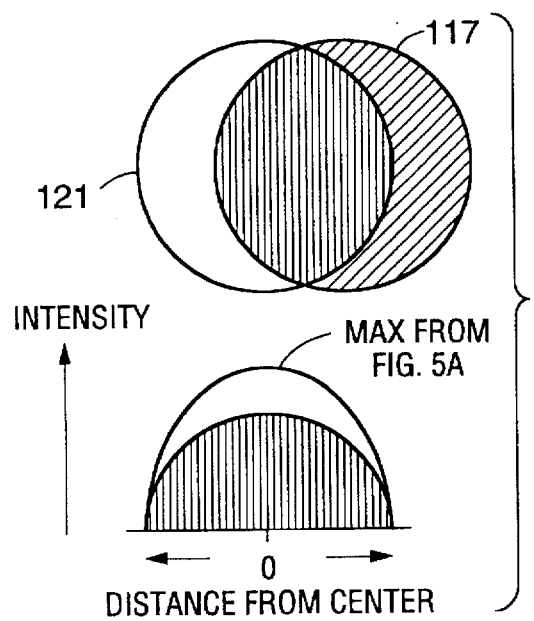
Figure 5C:
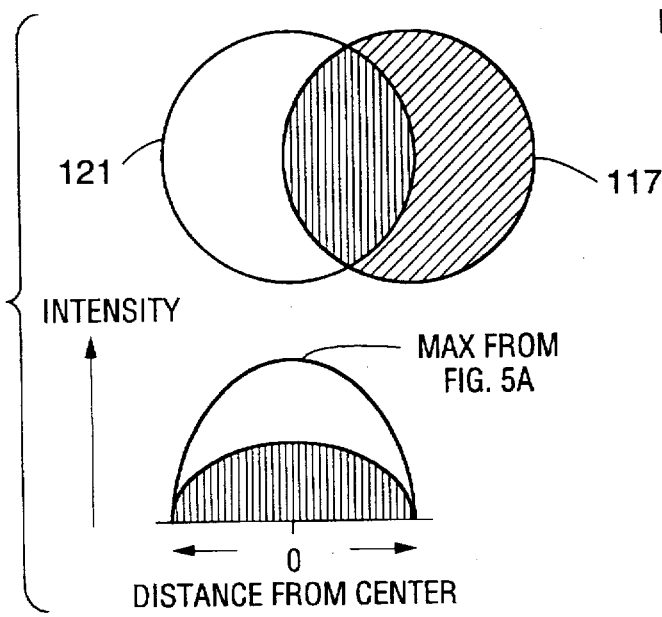

FIGS. 5A to 5C show in their upper portions the relation between the reflected light beam 117 and the aperture 121 of the output optical system 109 or 111 at different angles of rotation of the mirror 110. The lower portions of FIGS. 5A to 5C show the intensity profile across the diameter of the distal end of the light fibre 144 shown in FIG. 2. In FIG. 5A, the angle of rotation of the mirror is that which allows the reflected light beam 117 to enter the output optical system 109 or 111 fully, i.e., the maximum angle of rotation. The intensity of the light at the distal end of the light fibre has a maximum value, and is distributed across the diameter of the light fibre as shown in the lower portion of the FIG. 5A.

The upper portion of FIG. 5C shows the relation between the reflected light beam 117 and the aperture 121 of the output optical system 109 or 111 when the angle of rotation of the mirror 110 is greater than or less than the maximum angle of rotation. In practice, the angle of rotation of the mirror will be less than the maximum angle of rotation. Even though the rotation angles both less than and greater than the maximum produce the static effect shown in FIG. 5C, using an angle of rotation greater than the maximum angle of rotation gives rise to undesirable dynamic effects (the intensity overshoots to the maximum intensity as the angle of rotation passes the maximum angle of rotation). Moreover, an angle of rotation greater than the maximum angle of rotation reduces the maximum speed obtainable. The maximum value of the intensity of the light at the distal end of the light fibre is less than the maximum value of the intensity shown in FIG. 5A, but the light remains distributed across the diameter of the light fibre, as shown in the lower part of FIG. 5C. It can be seen from FIG. 5C that, although the reflected light beam 117 enters the output optical system 109 or 111 asymmetrically, the distribution of intensity across the diameter of the light fibre remains similar to that shown in FIG. 5A due to the homogenizing effect of the light fibre 144.

FIG. 5B shows the relation between the reflected light beam 117 and the aperture 121 of the output optical system 109 or 111 and the intensity profile across the diameter of the distal end of the light fibre 144 at an intermediate angle of rotation between the angles of rotation shown in FIGS. 5A and 5C.

By operating the high-speed optical switch in its analog mode, in which the drive to the galvanometer motor 112 is controlled to control the angle of rotation of the mirror 110, the intensity of the output light beam 118 delivered by each of the output optical paths 109 and 111 can be controlled to match the light intensities delivered by the two output optical paths to the combined optical path 113. Alternatively, the drive to the galvanometer motor 112 can be controlled to change the angle of rotation of the mirror to establish a deliberate mismatch between the light intensities delivered by the two output optical paths. This ability to control the light intensities delivered by the two output optical paths, and hence to control the relative spectral intensities of the alternating band light output generated by the alternating-band light source according to the invention, may additionally be useful for calibrating the ratiometric processing of fluorescence signals.

The ability of the optical switch according to the invention, when operated in its analog operating mode, to control the intensity of the light delivered by the output optical paths 109 and 111 to the combined optical path 113 may also allow for feedback stabilization of the light intensity of the combined light beam 119, and for reduction in noise in the combined light beam due to intensity fluctuations in the light source in the lamp house 102. When the lamp house 102 uses a xenon arc lamp, as is typical, the intensity of the light generated by the lamp randomly fluctuates. The fluctuations have spectral components at frequencies up to several tens of Hertz. By measuring the spectral intensities of the combined light beam, fluctuations in the spectral intensities may be detected and converted to an electronic signal that can be applied to a closed-loop control system which would modulate the drive to the galvanometer motor 112 in a manner which totally or partially corrects such intensity fluctuations.

Figure 6:
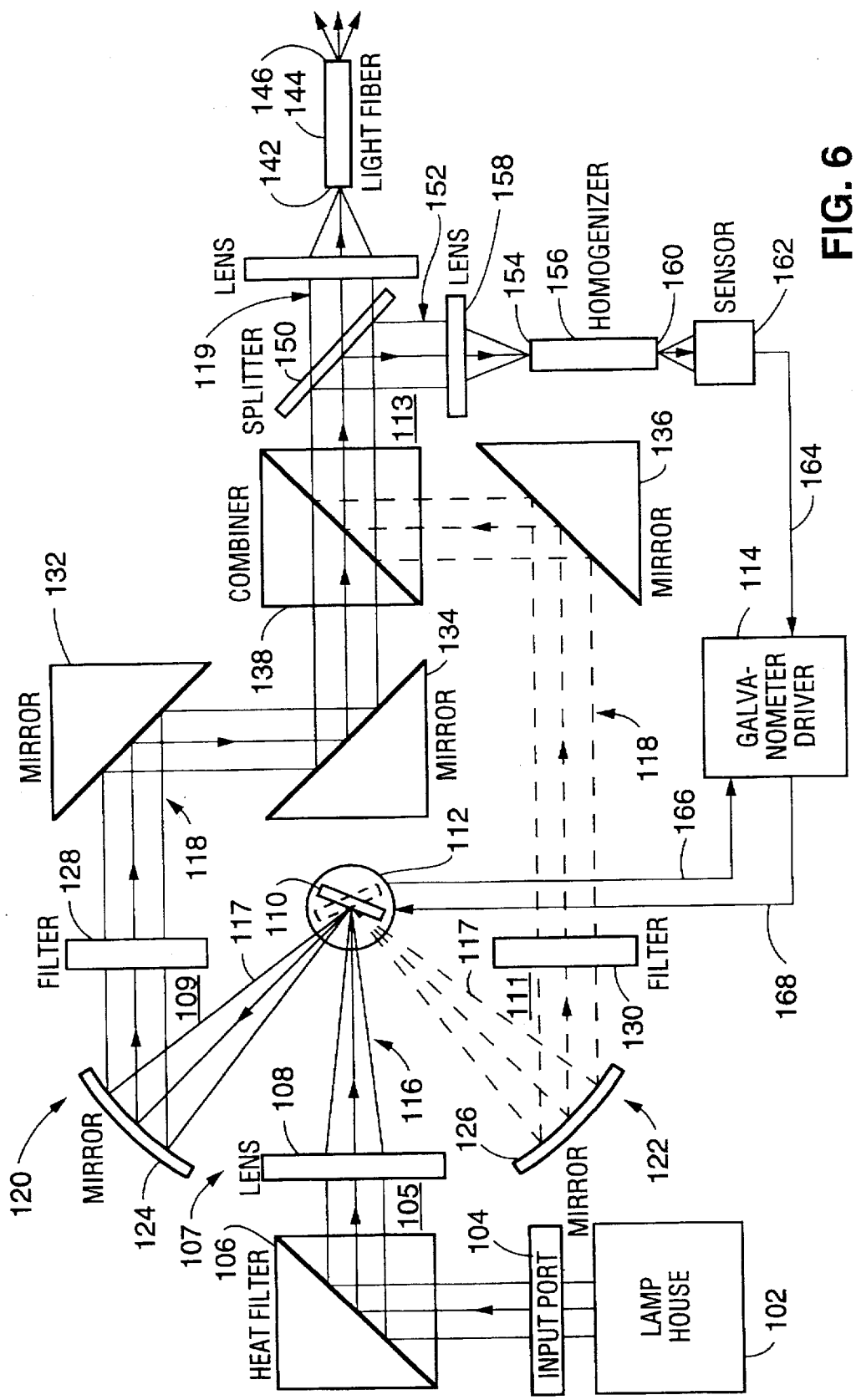
FIG. 6 shows an alternating-band light source according to the invention incorporating a high-speed optical switch according to the invention and a feedback arrangement to vary the angle of rotation of the mirror to control the relative intensity of the spectral bands of, and to reduce noise due to intensity fluctuations in, the combined light beam.

An embodiment including an arrangement to provide control of the relative intensities of the spectral bands in the combined light beam 119 delivered by the combined optical path 113, and for reducing noise due to intensity fluctuations in the spectral bands, is shown in FIG. 6.

Figure 1A:
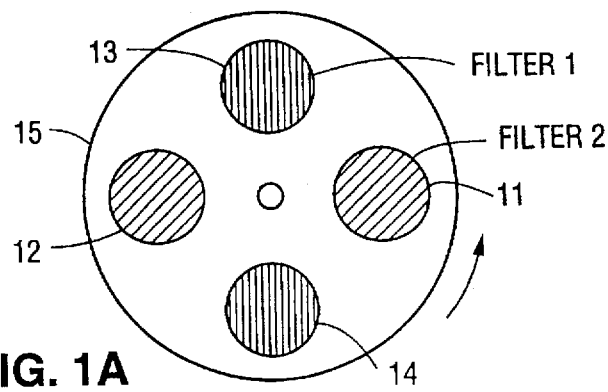
FIGS. 1A and 1B respectively show a front elevation of a filter wheel, and a side elevation of an alternating-band light source using a filter wheel.
Figure 1B:
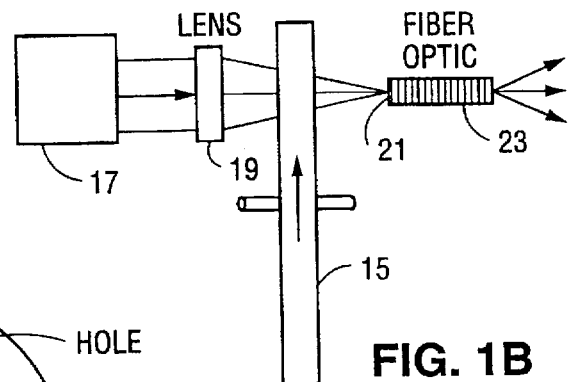
Figure 1C:
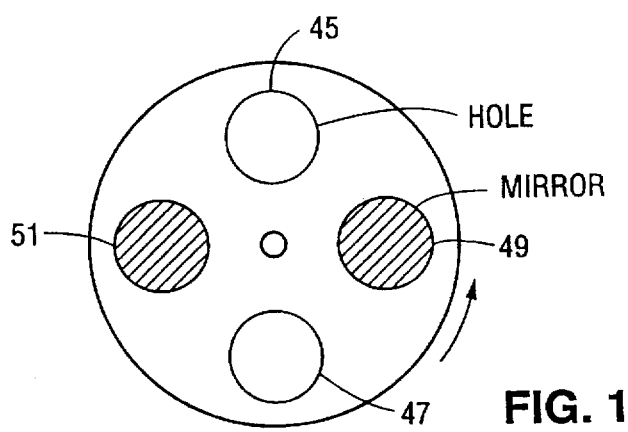
FIGS. 1C and 1D respectively show a front elevation of a mirror wheel, and a side elevation of an alternating-band light source using a mirror wheel.
Figure 1D:
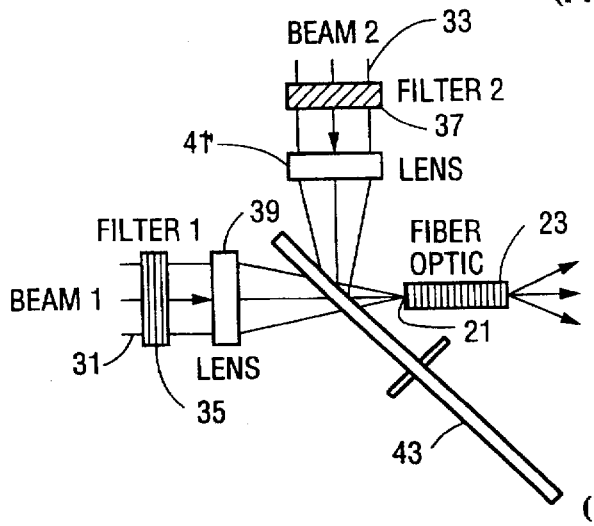
Figure 2:
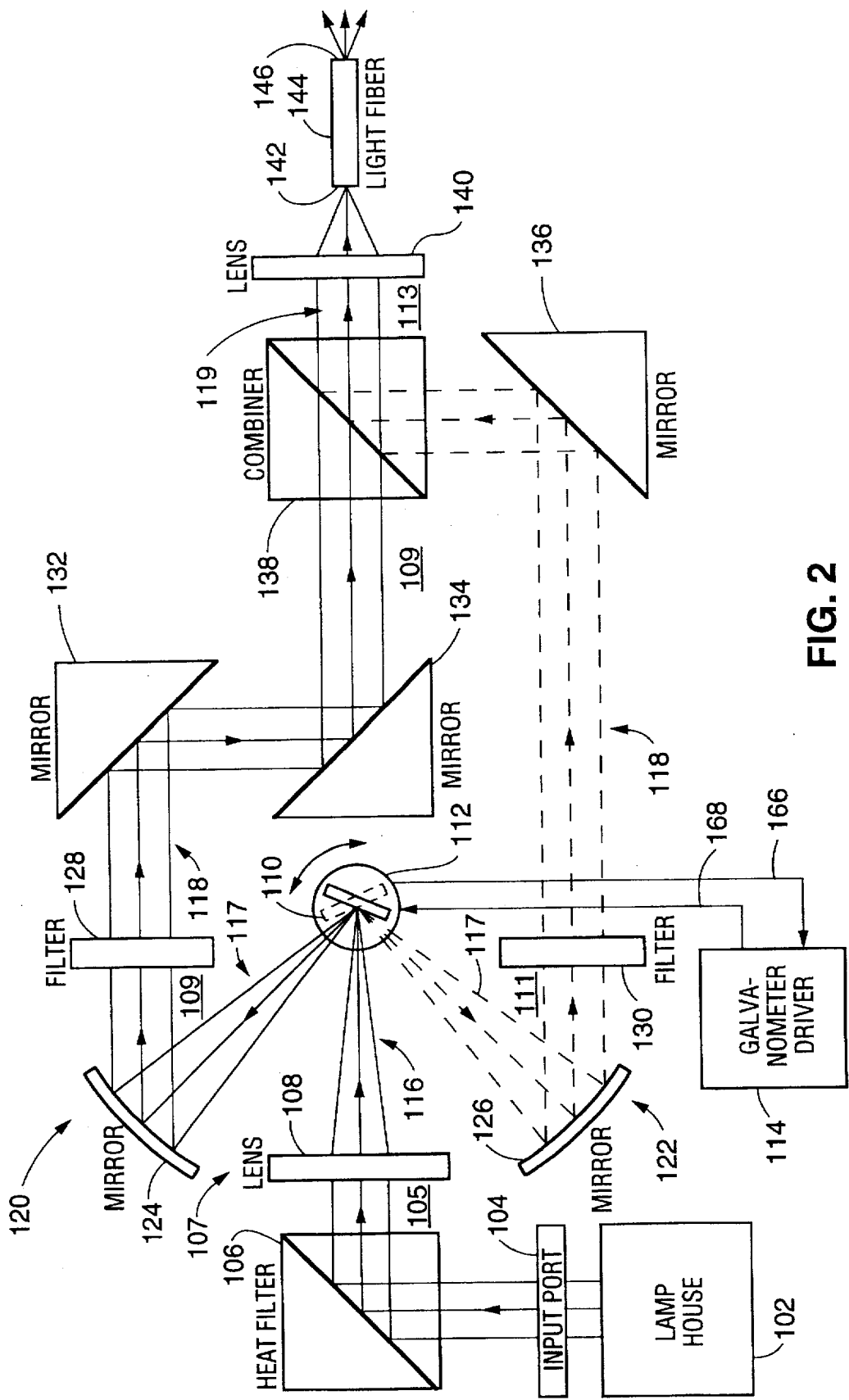
FIG. 2 shows an alternating-band light source according to the invention incorporating a high-speed optical switch according to the invention.

In FIG. 6, the optical arrangement of the alternating-band light source is the same as in the embodiment shown in FIG. 2, with the exception that the splitter 150 is added to take the sample light beam 152 from the combined light beam 119 in the combined optical path 113, downstream of the combiner 138. The intensity of the sample light beam depends on the application, and is generally less than 10% of that of the combined light beam 119. Alternatively, light reflected or scattered by the front surface of the output lens 140 or by some other element in the combined optical path 113 could be used as the sample light beam 152. One or more sample light beams could alternatively be derived from other points in the optical path of the apparatus.

The lens 158 focuses the sample light beam on the proximal end 154 of the homogenizer 156. The homogenizer emulates the homogenization of the combined light beam 119 by the light fibre 144. A light fibre, for example, may be used as homogenizer 156. The homogenized sample light beam from the distal end 160 of the homogenizer falls on the opto-electric sensor 162. The sensor 162 may be, for example, a photodiode. If multiple sample light beams are used, they could be optically combined and homogenized to fall on a single sensor, or could fall on individual homogenizers and sensors.

As an alternative to the arrangement shown, if the optical arrangement at the distal end 146 of the light fibre 144 permits, the splitter 150 may be located downstream of the distal end of the light fibre, and may extract the sample light beam 152 from the light beam emanating from the distal end of the light fibre. With the splitter in this location, the homogenizer 156 and the lens 158 may be omitted.

The sensor 162 delivers the electrical signal 164 to the galvanometer driver 114. The electrical signal 164 represents the intensity of the light falling on the sensor 162. If the intensity of the components of the combined light beam 119 delivered by the two output optical paths 109 and 111 is different, i.e., if the intensity of the spectral bands is different, the level of the signal 164 will change in synchronism with the rotation of the galvanometer motor 112 and mirror 110. If the intensity of the light generated by the lamp house 102 fluctuates, there will be superimposed on the variations in the electrical signal 164 due to the differences in the spectral intensities additional variations due to the intensity fluctuations.

The galvanometer driver 114 also receives the positional feedback signal 166 from the galvanometer motor 112. The positional feedback signal represents the rotational angle of the galvanometer motor 112 and the mirror 110, and is fed to the galvanometer motor drive servo (not shown) in the galvanometer driver 114, which generates the galvanometer motor drive signal 168 to drive the galvanometer motor 112.

By comparing the electrical signal 164 from the sensor 162 with a reference voltage representing the desired intensity of the combined light beam, an intensity error signal can be generated. The intensity error signal represents the intensity errors due to the difference in intensity between the spectral bands, and also due to the fluctuations in the intensity of the light generated by the lamp house 102. The intensity error signal is then used to modify the positional feedback signal 166 from the galvanometer motor 112. Modifying the positional feedback signal changes the operation of the galvanometer motor drive servo, thereby changes the maximum angle of rotation of the galvanometer motor 112, and hence of the mirror 110. Because the efficiency of the coupling between the reflected light beam 117 and the output optical paths 109 and 111 depends on the maximum angle of rotation of the mirror 110, the operation of the galvanometer motor drive servo to change the maximum angle of rotation of the mirror can be controlled in a manner that reduces the differences in intensity between the spectral bands, and that reduces the fluctuations in the light intensity due to the fluctuations in the intensity of the light generated by the lamp house 102.

The alternating-band light source according to the invention provides high-speed multiplexing between the two spectral bands defined by the combination of the filters 106, 128, and 130, and additionally the combiner 138, if dichroic. Since the filters 128 and 130 are located in the different output optical paths 109 and 111 to which the reflected light beam 117 is switched, and the output light beams 118 transmitted via the two output optical paths are combined after the filters 128 and 130, the apparatus generates a combined light beam having alternating spectral bands. Additionally, the combined light beam can rapidly be switched off, as shown in FIGS. 3A and 3B. As described above, the high-speed optical switch in the alternating-band light source can be operated in its analog mode, which allows the light intensity of the two spectral regions to be changed independently within certain limits, statically or dynamically.

The basic structure of the alternating-band light source described herein can be used to provide more than two spectral bands, if desired. Alternatively or additionally, multiples of the basic light source could be coupled together at the distal end 146 of the light fiber 144 by a suitable mixer. This would allow expansion to more spectral bands. Other coupling/combining modes are also possible.

Operational flexibility can be provided by incorporating manually- or mechanically-operated filter cartridges for changing the band selection filters 128 and 130.

Figure 7:
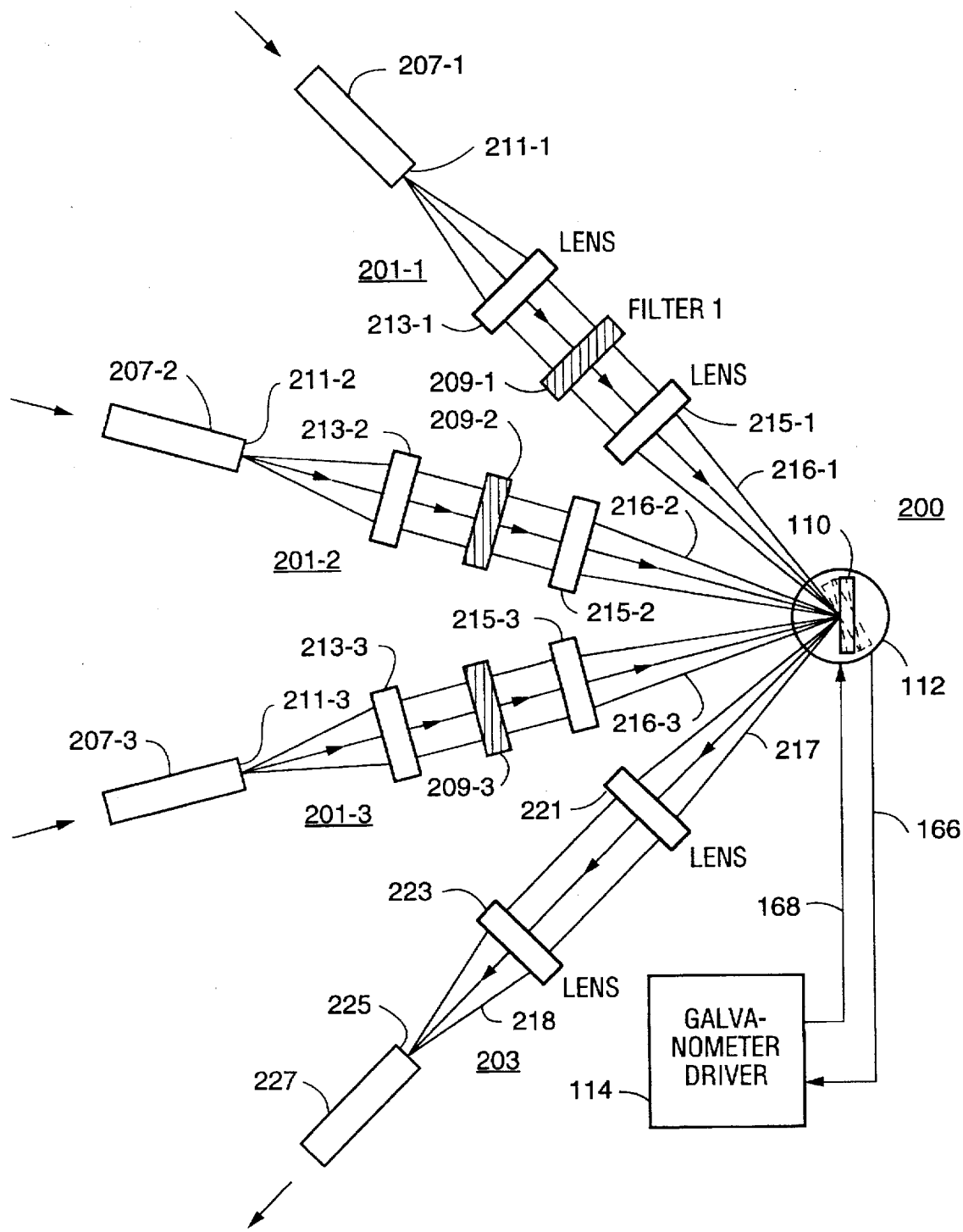
FIG. 7 shows a multi-band light source according to the invention incorporating a high-speed optical switch according to the invention.

An embodiment of a multiple-band light source according to the invention embodying a variation on the high-speed optical switch according to the invention is shown in FIG. 7. The embodiment shown uses three input optical paths 201-1, 201-2, and 201-3, to generate in the output optical path 203 an output light beam 218 having a sequence of up to three spectral bands. The apparatus is modular, so an output light beam with more spectral bands can be generated by adding more input optical paths. The practical limitations on the number of input optical paths are the maximum peak-to-peak angle of rotation of the galvanometer motor, and the angle that the entry pupil of the output optical system subtends at the respective input optical paths after reflection by the mirror 110 (the angular spacing between adjacent input optical paths must be greater than this to prevent crosstalk between channels). An output light beam with fewer bands can be provided by controlling the rotation of the galvanometer motor 112 and mirror 110 so that the light from one of the input optical paths is not switched to the output optical path 203.

In the multiple-band light source 200, light generated by a suitable lamp house (not shown) is conducted to each of the input optical paths 201-1, 201-2 and 201-3 by the light fibres 207-1, 207-2 and 207-3. Since the input optical paths are identical except for the characteristics of the spectral band selection filters 209-1, 209-2, and 209-3, only the input optical path 201-1 will be described. Elements of the input optical path 201-1 are indicated by the suffix "-1," and corresponding elements in the input optical paths 201-2 and 201-3 are indicated by the suffixes "-2" and "-3."

The proximal end 211-1 of the light fibre 207-1 is located at or near the focal point of the lens 213-1. Consequently, the lens 213-1 forms light diverging from the light fibre into a parallel beam for passage through the band selecting filter 209-1. After filtering by the band selecting filter, the light is then focussed on the mirror 110 by the lens 215-1.

In the output optical path 203, the lens 221 is located so that the mirror 110 is at or near its focal point. Accordingly, the lens 221 converts light diverging from the mirror into a parallel beam, which passes to the lens 223. The lens 223 is located such that its focal point is located at or near the proximal end 225 of the output light fibre 227. The lens 223 focuses the parallel beam received from the lens 221 on the proximal end of the output light fibre 227.

The galvanometer motor 112 drives the mirror 110 rotationally about an axis that is substantially perpendicular to the plane of the input optical paths 201-1, 201-2 and 201-3. As in the embodiment described above with reference to FIG. 2, the galvanometer motor receives the galvanometer drive signal 168 from the galvanometer driver 114, and preferably feeds the positional feedback signal 166 back to the galvanorneter driver.

The galvanometer driver 114 controls the rotation of the galvanometer motor 112, and, hence, the rotation of the mirror 110 to rotational angles at which the reflected light beam 217 resulting from the reflection of one of the input light beams 216-1, 216-2, and 216-3 from each of the input optical paths 201-1, 201-2, and 201-3 by the mirror 110 enters the output optical path 203. The reflected light beams resulting from reflection of the input light beams by the mirror 110 have been omitted from FIG. 7 to simplify the drawing. The galvanometer driver 114 can additionally control the rotation of the galvanometer motor 112 and the mirror 110 to rotational angles at which none of the reflected light beams resulting from the reflection of one of the input light beams 216-1, 216-2, and 216-3 from each of the input optical paths 201-1, 201-2, and 201-3 by the mirror 110 enters the output optical path 203 to shutter the output light beam "off."

The rotational dynamics of the galvanometer motor 112 and the mirror 110 may be controlled as described above. Also as described above, the intensity of the output light beam 218 may be sampled, and a signal derived from the sample may be used to control the angle of rotation of the galvanometer motor and the mirror at which the mirror reflects the input light beam from each of the input optical paths 201-1, 201-2, and 201-3 into the output optical path 203. This enables the intensities of the spectral bands in the output light beam 218 to be matched (or to be deliberately mismatched) and noise due to fluctuations in the light intensity of the light generated by the lamp house to be reduced.

While FIG. 7 shows a arrangement in which the output optical path 203 is coplanar with the input optical paths 201-1, 201-2, and 201-3, it is possible introduce an angle between the plane of the output optical path and the plane of the input optical paths, and to set the mirror 110 at an angle that is not perpendicular to the plane defined by the input optical paths. This would allow the output light fibre 227 to be stacked above one of the input light fibres 207-1, 207-2, and 207-3, which would make angular space available for additional input optical paths.

Finally, the embodiments shown in FIG. 2 and FIG. 7 may be combined to provide an apparatus having plural input optical paths and plural output optical paths arranged relative to the position of the mirror 110 such that rotating the mirror 110 to the appropriate angle enables an input light beam from a selected one of the input optical paths to be switched into a selected one of the output paths.

The high-speed optical switch according to the invention can also be used to multiplex, chop or otherwise modulate (see above) light emitted from an object other than the lamp house 102. The light emitted from an object may be, for example, fluorescence emission from a microscopic sample, tissue, etc., or from any other source. In a fluorescence application, it may be desirable to multiplex an image between spectral bands and have the split images alternatively superimpose onto a detector or image pickup device. The high-speed optical switch according to the invention can also be used to demultiplex an input light beam.

Figure 8:
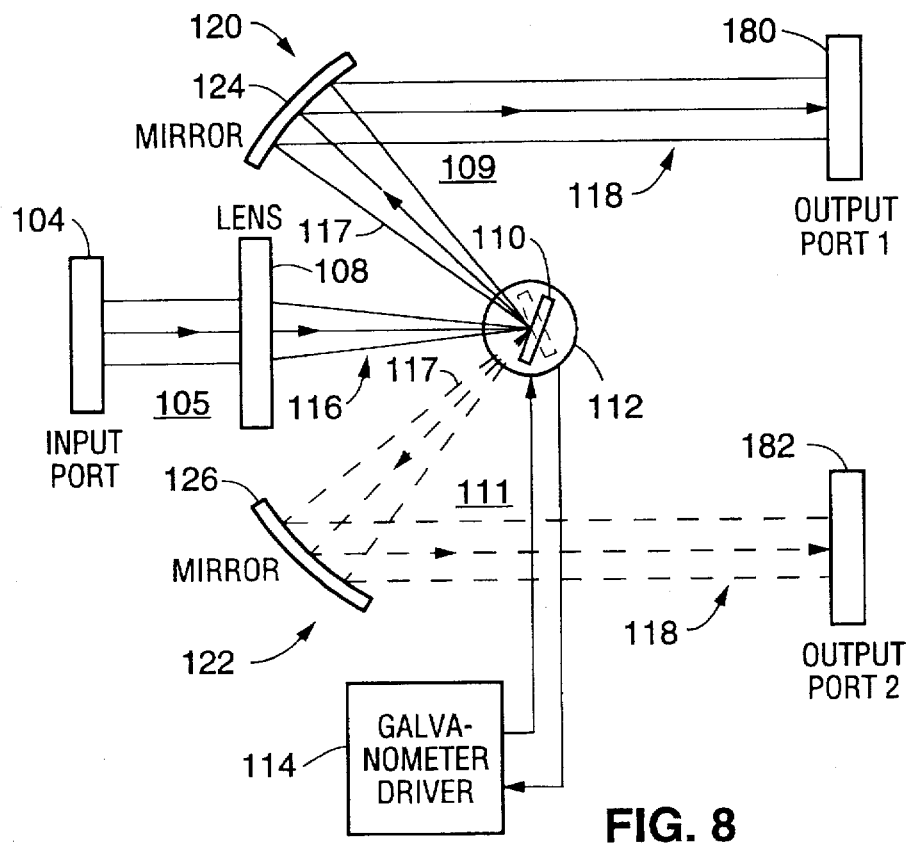
FIG. 8 shows the high-speed optical switch according to the invention used as a demultiplexer.

FIG. 8 shows the high-speed optical switch according to the invention used as a demultiplexer. Elements of FIG. 8 corresponding to elements of FIG. 2 are indicated by the same reference numerals, and will not be described again here. In FIG. 8, the light beam for demultiplexing is received as a parallel light beam at the input port 104. Non-parallel light beams may be received by using a suitable additional lens (not shown) or by changing the optical characteristics of the lens 108. The optical switch demultiplexes the input light beam by deflecting the reflected light beam 117 to either the output port 180 via the output optical path 109 or to the output port 182 via the output optical path 111. The output light beam 118 supplied to the output ports 180 and 182 is a parallel beam. Non-parallel light beams may be supplied by using suitable additional lenses (not shown) or by changing the optical characteristics of the mirrors 124 and 126.

If the output light beams are subsequently homogenized, their intensity may be monitored using an arrangement similar to that shown in FIG. 6, and the optical switch may be operated in its analog mode, as described above, to control the relative intensities of the output light beams. The optical switch may be operated in its analog mode, as described above, additionally or alternatively to reduce noise in the output light beams to intensity fluctuations in the input light beam.

Figure 9:
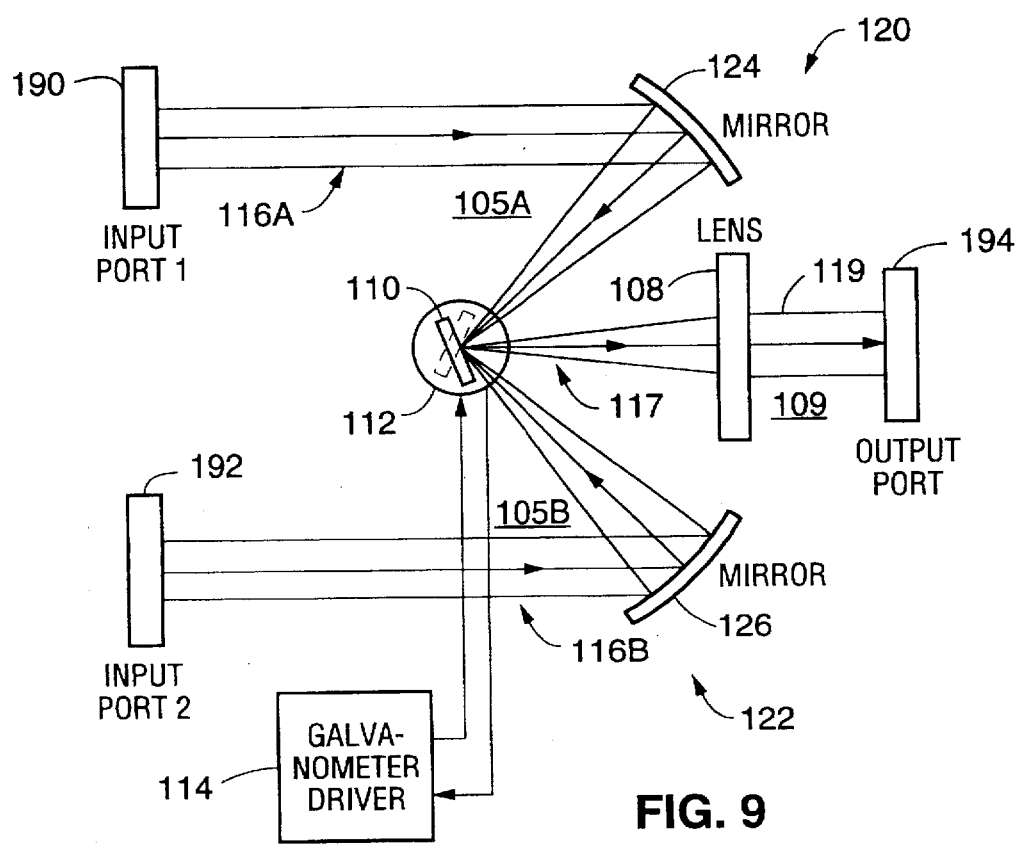
FIG. 9 shows the high-speed optical switch according to the invention used as a multiplexer.

FIG. 9 shows the high-speed optical switch according to the invention used as a multiplexer. Elements of FIG. 9 corresponding to elements of FIG. 2 are indicated by the same reference numerals, and will not be described again here. In FIG. 9, the light beams for multiplexing are received as parallel light beams at the input ports 190 and 192. Non-parallel light beams may be received by using suitable additional lenses (not shown) to convert the non-parallel light beams to parallel light beams, or by changing the optical characteristics of either or both the mirrors 124 and 126. The input light beam 116A received via the input port 190 is fed to the input light path 105A, and the input light beam 116B received via the input port 192 is fed to the input light path 105B. The optical switch multiplexes the input light beams 116A and 116B by selecting one of them to reflect into the lens 108 as the reflected beam 117. The input light beam not selected by the optical switch has been omitted from FIG. 9 to simplify the drawing.

The lens 108 refracts the reflected light beam 117 to form the output light beam 119, which is fed to the output port 194 via the output path 109 as a parallel light beam. A non-parallel light beam may be supplied by using a suitable additional lens (not shown) or by changing the optical characteristics of the lens 108.

If the output light beam is subsequently homogenized, its intensity may be monitored using an arrangement similar to that shown in FIG. 6, and the optical switch may be operated in its analog mode, as described above, to control the relative intensities of the contributions of the input light beams to the output light beam. The optical switch may be operated in its analog mode, as described above, additionally or alternatively to reduce noise in the output light beam to intensity fluctuations in the input light beams.

In the embodiment shown in FIG. 9, the light beams supplied to the input ports 190 and 192 could be derived by splitting the light beam from a single light source (e.g., a microscope image). An arrangement similar to that formed by the combiner 138 and the mirrors 132, 134, and 136 shown in FIG. 2 with the direction of light reversed could be used to split the light beams from the single light source. Different filtering could then be applied in the two input optical paths 116A and 116B, and the combined light beam including the differently-filtered components at the output port 194 could then be used for measurement or observation. The embodiment shown in FIG. 8, with the addition of an arrangement similar to that formed by the combiner 138 and the mirrors 132, 134, and 136 shown in FIG. 2 to combine the light from the two output ports 180 and 182 and different filtering applied in the two output paths 118, could alternatively be used.

Figure 10:
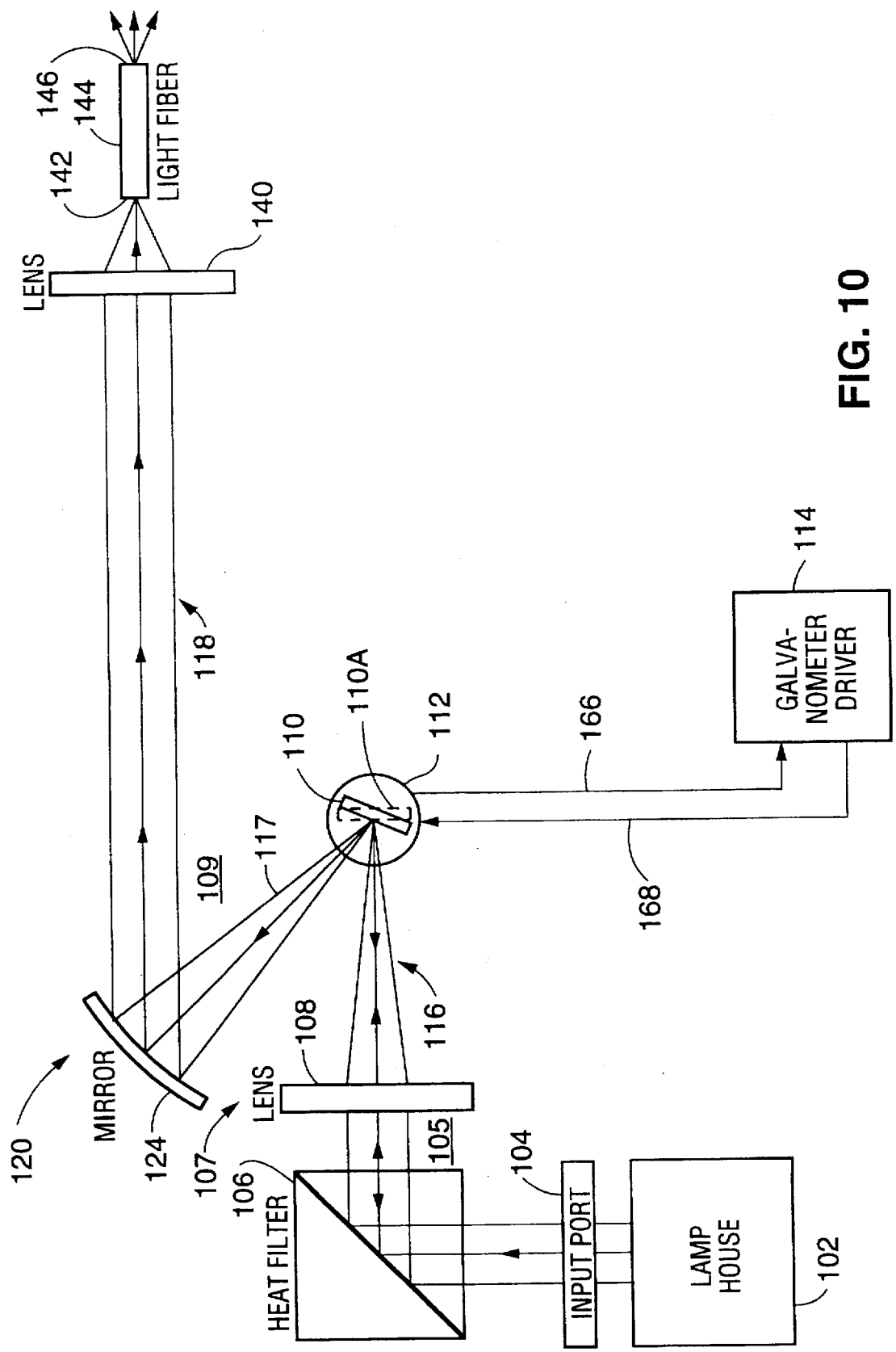
FIG. 10 shows the high-speed optical switch according to the invention used as a chopper for a single light beam.

FIG. 10 shows the high-speed optical switch according to the invention used as a chopper for a single light beam. Elements of FIG. 10 corresponding to elements of FIG. 2 are indicated by the same reference numerals, and will not be described in detail again here. In FIG. 10, the light beam for chopping is received as the input light beam 116 from the lamp house 102 via the input port 104 and the heat filter 106. The input light beam 116 is focussed on the mirror 110 by the input optical system 107, which, in this example, consists of the lens 108. In the optical switch, the input light beam is chopped by the mirror 110 rotating back-and-forth to deflect the reflected light beam 117 reflected from the mirror into, or not into, the output optical path 109. In the example shown, the output optical path 109 includes the output optical system 120 (i.e., the mirror 124), which forms the reflected light beam 117 diverging from the mirror 110 into the parallel output light beam 118, and the output lens 140, which refocuses the output light beam 118 onto the proximal end 142 of the light fibre 144. The output lens 140 and light fibre 144 can be omitted if a parallel output light beam is required.

To simplify the drawing, the mirror 110 is shown as reflecting the input light beam 116 directly back into the input optical system 107 when the mirror is in the "off" position 110A. However, in practice, the angle through which the mirror need be rotated to cut the reflected light beam 117 off from the output optical path 109, relative to the angle to which it is rotated to cause the reflected light beam 117 to fully enter the output optical path 109, can be smaller than that shown. This enables the maximum chopping speed to be increased.

The mark-space ratio of the chopped output light beam 118 and the chopping frequency are controlled by the rotation of the mirror 110 which is determined by the drive signal 168 fed to the galvanometer 112 by the galvanometer drive 114.

Figure 11:
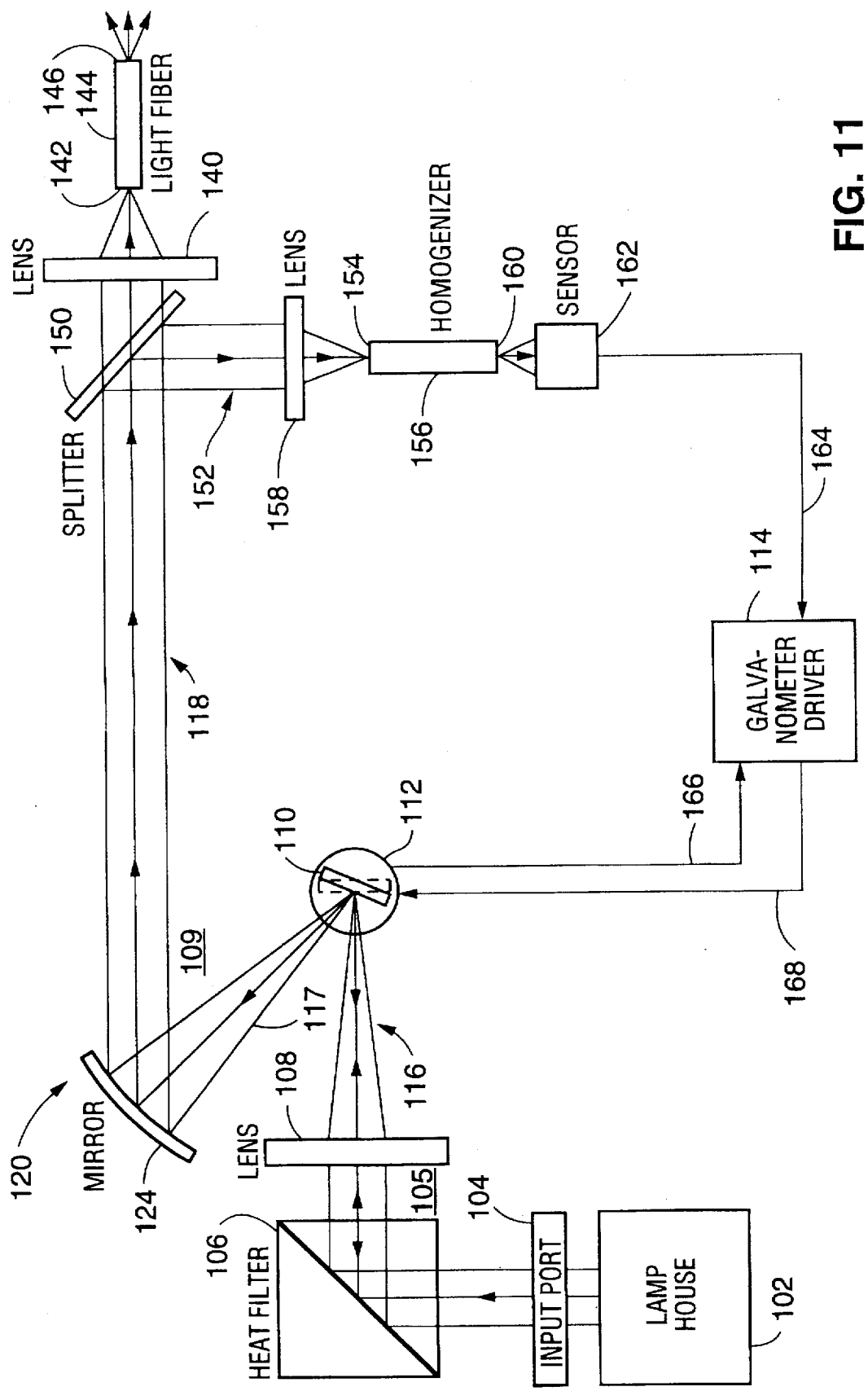
FIG. 11 shows the high-speed optical switch according to the invention configured additionally to operate in its analog mode to control the intensity of, and reduce noise due to intensity fluctuations in, the output light beam generated by the chopper shown in FIG. 10.

FIG. 11 shows the high-speed optical switch according to the invention configured additionally to operate in its analog mode to control the intensity of, and reduce noise due to intensity fluctuations in, the output light beam generated by the chopper shown in FIG. 10. Elements of FIG. 11 corresponding to elements of FIGS. 4 and 8 are indicated by the same reference numerals, and will not be described again here. In FIG. 11, the splitter 150 derives the sample light beam 152 from the output light beam 118 in the output optical path 109, and feeds the sample light beam to the sensor 162 via the lens 158 and the homogenizer 156. The electrical signal 164 from the sensor 162, which represents the intensity of the sample light beam 152 and, hence, of the output light beam 118, is then used to control the maximum angle of rotation of the mirror 110 in the direction of the output optical path 109. The angle of rotation of the mirror 110 determines the efficiency of coupling between the reflected light beam 117, reflected from the mirror 110, and the output light path 109 and, hence, the intensity of the output light beam 118.

In the embodiment shown in FIG. 11, the high-speed optical switch according to the invention can be used solely in its analog mode to control the intensity of, and to reduce noise due to intensity fluctuations in, a static output light beam. In other words, the galvanometer driver 114 does not cause the galvanometer motor 112 to cause the mirror 110 to rotate back-and-forth to cause the reflected light beam to enter, or not enter, the output optical path 109. Instead, the galvanometer driver 114 operates in response to the output of the sensor 162 to cause the galvanometer motor 112 vary the rotational angle of the mirror 110 to control the amount of the reflected light beam 117 that enters the output optical path, and, hence, to control the intensity of the output light beam, as described above.

Although illustrative embodiments of the invention have been described herein in detail, it is to be understood that the invention is not limited to the precise embodiments described, and that various modifications may be practiced within the scope of the invention defined by the appended claims.

I claim:

1. A high-speed optical switch, comprising:
    a first light port;
    a second light port;
    focussing means for focussing light from the first light port at a focal point via a first optical path, and for focusing light from the second light port at a point at or near the focal point via a second optical path, the first optical path being angularly separated from the second optical path, wherein light focussed by said focusing means has a minimized spot size at or near the focal point;
    a mirror located at or near the focal point; and
    motor means, coupled to the mirror, for sequentially rotating the mirror back-and-forth between a first rotational position, at which the mirror reflects light from first light port into the second light port via the first optical path and the second optical path, and a second rotational position, at which the mirror reflects the light from the first light port to a location outside the second light port.

2. The optical switch of claim 1, wherein:
    the optical switch additionally includes a third light port;
    the focussing means is additionally for focusing light from the third light port at a point at or near the focal point via a third optical path, the third optical path being angularly separated from first optical path and the second optical path; and
    in the second rotational position, the mirror reflects light from the first light port to the third light port via the first optical path and the third optical path.

3. The optical switch of claim 1, wherein:
    the optical switch additionally includes a third light port;
    the focussing means is additionally for focusing light from the third light port at a point at or near the focal point via a third optical path, the third optical path being angularly separated from first optical path and the second optical path;
    the motor means is for sequentially rotating the mirror back-and-forth between the first rotational position, the second rotational position, and a third rotational position at which the mirror reflects light from the first light port to the third light port via the first optical path and the third optical path; and
    in the second rotational position, the mirror reflects the light from the first light port to a location outside the second light port and outside the third light port.

4. The optical switch of claim 1, wherein:
    the optical switch additionally includes a third light port;
    the focussing means is additionally for focusing light from the third light port at a point at or near the focal point via a third optical path, the third optical path being angularly separated from first optical path and the second optical path; and
    in the second rotational position, the mirror reflects light from the third light port to the second light port via the third optical path and the second optical path.

5. The optical switch of claim 1, wherein:
    the optical switch additionally includes a third light port;
    the focussing means is additionally for focusing light from the third light port at a point at or near the focal point via a third optical path, the third optical path being angularly separated from first optical path and the second optical path;
    the motor means is for sequentially rotating the mirror back-and-forth between the first rotational position, the second rotational position and a third rotational position at which the mirror reflects light from the third light port to the second light port via the third optical path and the second optical path; and
    in the second rotational position, the mirror additionally reflects the light from the third light port to a location outside the second light port.

6. The optical switch of claim 1, wherein:
    the light from the first light port reflected from the mirror forms a reflected light beam; and
    the motor means includes intensity changing means for changing the first rotational position to vary an amount of the reflected light beam entering the second light port relative to a maximum amount.

7. The optical switch of claim 6, wherein the focussing means includes:
    collimating means in the second optical path for collimating the reflected light beam; and
    aperture means for defining an aperture along the second optical path for the collimated reflected light beam;

wherein when the intensity changing means changes the first rotational position, the collimated reflected light beam is attenuated by the aperture means.

8. A high-speed optical switch, comprising:

a first light port;

a second light port;

focussing means for focussing light from the first light port at a focal point via a first optical path, and for focusing light from the second light port at a point at or near the focal point via a second optical path, the first optical path being angularly separated from the second optical path;

a mirror located at or near the focal point;

motor means, coupled to the mirror, for sequentially rotating the mirror back-and-forth between a first rotational position, at which the mirror reflects light from first light port into the second light port via the first optical path and the second optical path, and a second rotational position, at which the mirror reflects the light from the first light port to a location outside the second light port:

the light from the first light port reflected from the mirror forms a reflected light beam;

the motor means includes intensity changing means for changing the first rotational position to vary an amount of the reflected light beam entering the second light port relative to a maximum amount the reflected light beam entering the second light port emanates from the second light port as a light beam having an intensity;

the optical switch additionally comprises sensing means for sensing the intensity of the light beam emanating from the second light port and for providing a feedback signal to the intensity changing means; and the intensity changing means operates in response to the feedback signal to control the intensity of the light emanating from the second light port to a predetermined value.

9. The optical switch of claim 8, wherein:

the light from the first light port is subject to intensity fluctuations; and the sensing means and the intensity changing means operate to reduce noise in the light beam emanating from the second light port due to the intensity fluctuations in the light from the first light port.

10. A high-speed optical switch, comprising:

a first light port;

a second light port;

focussing means for focussing light from the first light port at a focal point via a first optical path, and for focusing light from the second light port at a point at or near the focal point via a second optical path, the first optical path being angularly separated from the second optical path;

a mirror located at or near the focal point; and motor means, coupled to the mirror, for sequentially rotating the mirror back-and-forth between a first rotational position, at which the mirror reflects light from first light port into the second light port via the first optical path and the second optical path, and a second rotational position, at which the mirror reflects the light from the first light port to a location outside the second light port;

the light from the first light port reflected from the mirror forms a reflected light beam; and the motor means includes intensity changing means for changing the first rotational position to vary an amount of the reflected light beam entering the second light port relative to a maximum amount;

collimating means in the second optical path for collimating the reflected light beam; and aperture means for defining an aperture along the second optical path for the collimated reflected light beam;

wherein when the intensity changing means changes the first rotational position, the collimated reflected light beam is attenuated by the aperture means.

11. The optical switch of claim 10, wherein light focussed by said focusing means has a minimized spot size at or near the focal point.

* * * * *